United States Patent Office.

WILLIAM B. DAVIS, OF BROOKLYN, NEW YORK.

Letters Patent No. 94,084, dated August 24, 1869.

---

IMPROVED COMPOSITION FOR COVERING STEAM-BOILERS, PIPES, AND OTHER ARTICLES.

---

The Schedule referred to in these Letters Patent and making part of the same.

---

To all whom it may concern:

Be it known that I, WILLIAM B. DAVIS, of Brooklyn, in the county of Kings, and State of New York, have invented a new and improved Composition for Coating Boilers, Pipes, Drums, and other articles; and I do hereby declare the following to be a full, clear, and exact description thereof, which will enable others skilled in the art to make and use the same.

My invention relates to a new composition, which is applicable for coating metallic articles, such as boilers, pipes, tubes, drums, shafting, architectural iron-work, and other articles, for the purpose of preventing oxidation; and is also applicable for other uses, such as patching boilers, pipes, tubes, and other vessels or articles, for making steam-tight joints, wherever such joints are required, for embedding boilers on their foundations, and other purposes.

My invention consists in a new composition, composed of the residuum and fatty matters which remain from or after the distillation of palm-oil, mixed with Roman or other equivalent cement, in the following manner and proportions; that is to say:

I melt the said residuum to a liquid state, and then add the cement in a dry state, taking about equal parts by measure of said residuum and cement, and mix them well together. The composition is applied while in a fluid or plastic state, and as soon as can be after the ingredients are mixed together, as it hardens soon upon cooling.

My new composition forms a good insulator for electrical purposes.

I do not confine myself to the above proportions, as they can be varied by using less of the cement, or more, in proportion, according to the conditions of its use, as, for instance, when it is desired to gain time before the compound sets or hardens, less cement is used, and vice versa.

In making the composition, the residuum is melted to a fluid state, and the dry cement added to it, and mixed thoroughly, and the compound is then dipped out or run off, or poured off, so as to form layers or cakes, and allowed to cool and harden, in which condition it can be transported to the place where it is to be used, when it is again brought to a sufficiently fluid or plastic state by heat, so that it can be applied to the use required. The mixture can also be used immediately on being first made.

When I desire to make the composition so as to be capable of enduring a very high heat, as when it is applied to boilers, vessels, or pipes, containing superheated steam, or as when it is applied to other articles which must endure or be exposed to a very high temperature, I add a larger proportion than one-half of cement, and continue to boil the mixture, adding higher degree of heat until it is sufficiently stiff, and has been brought to a suitable consistency.

What I claim as new, and desire to secure by Letters Patent, is—

The new composition, substantially as above described, and its use as a coating or covering for metallic articles.

W. B. DAVIS.

Witnesses:
C. WAHLERS,
E. F. KASTENHUBER.